US012189570B2

(12) United States Patent
Du et al.

(10) Patent No.: US 12,189,570 B2
(45) Date of Patent: Jan. 7, 2025

(54) LOW LATENCY NODES FUSION IN A RECONFIGURABLE DATA PROCESSOR

(71) Applicant: SambaNova Systems, Inc., Palo Alto, CA (US)

(72) Inventors: Yun Du, Palo Alto, CA (US); Jianding Luo, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 38 days.

(21) Appl. No.: 18/199,572

(22) Filed: May 19, 2023

(65) Prior Publication Data

US 2023/0385231 A1 Nov. 30, 2023

Related U.S. Application Data

(60) Provisional application No. 63/345,762, filed on May 25, 2022.

(51) Int. Cl.
*G06F 8/41* (2018.01)
*G06F 15/78* (2006.01)

(52) U.S. Cl.
CPC .......... *G06F 15/7878* (2013.01); *G06F 8/433* (2013.01)

(58) Field of Classification Search
CPC ...... G06F 15/7878; G06F 15/76; G06F 8/433; G06F 8/40; G06F 8/41; G06F 9/22
See application file for complete search history.

(56) References Cited

U.S. PATENT DOCUMENTS

| | | | | |
|---|---|---|---|---|
| 7,928,763 B2 * | 4/2011 | Vorbach | .............. | G06F 9/30145 326/46 |
| 8,156,284 B2 * | 4/2012 | Vorbach | ................ | G06F 9/3455 711/159 |
| 8,803,552 B2 * | 8/2014 | Vorbach | .............. | G06F 13/4068 326/38 |
| 8,914,590 B2 * | 12/2014 | Vorbach | .............. | G06F 12/0862 711/143 |
| 9,081,928 B2 * | 7/2015 | Van Eijndhoven | ..... | G06F 8/456 |

(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Cheng Yuan Tseng
(74) *Attorney, Agent, or Firm* — Flagship Patents; Rutawari Sharma; Sikander M. Khan

(57) ABSTRACT

A data processing system includes an array of reconfigurable units and a compiler configured to generate a pipeline of n computational nodes related to a dataflow graph, interleaved between n+1 buffers on the array of reconfigurable units. Each computational node is coupled to perform calculations based on data received from an immediately preceding buffer of the n+1 buffers and store results of the calculations into an immediately following buffer of the n+1 buffers after a latency. The compiler is further configured to remove a buffer of the n+1 buffers from the pipeline based on a comparison of the latencies of the computational nodes. A corresponding method is also disclosed herein.

20 Claims, 14 Drawing Sheets

(56) References Cited

U.S. PATENT DOCUMENTS

| | | | |
|---|---|---|---|
| 9,348,587 B2* | 5/2016 | Vorbach | G06F 9/30167 |
| 9,703,538 B2* | 7/2017 | Vorbach | G06F 8/41 |
| 9,898,297 B2* | 2/2018 | Vorbach | G06F 9/3836 |
| 10,394,729 B2* | 8/2019 | Dubrulle | G06F 8/40 |
| 10,579,584 B2* | 3/2020 | Vorbach | G06F 15/80 |
| 10,698,853 B1 | 6/2020 | Grohoski et al. | |
| 10,831,507 B2* | 11/2020 | Shah | G06F 15/7867 |
| 11,237,971 B1* | 2/2022 | Brown | G06F 15/7892 |
| 11,386,038 B2* | 7/2022 | Prabhakar | G06F 15/17325 |
| 11,954,061 B2* | 4/2024 | Wang | G06F 9/5066 |
| 12,032,841 B2* | 7/2024 | Zhang | G06F 8/433 |
| 12,039,305 B2* | 7/2024 | Yuan | G06F 9/3818 |
| 2019/0377580 A1* | 12/2019 | Vorbach | G06F 1/20 |
| 2021/0373867 A1* | 12/2021 | Chen | G06F 8/452 |
| 2022/0012077 A1 | 1/2022 | Kumar et al. | |
| 2022/0092247 A1* | 3/2022 | Koeplinger | G06F 8/443 |
| 2022/0261364 A1* | 8/2022 | Prabhakar | G06F 15/7867 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al., A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

* cited by examiner 700, 710

User Program Statements

Linear = torch.nn.linear(K,N)
Relu – torch.nn.relu
Softmax = torch.nn.Softmax(dim=3)
X1 = torch.randn(N, C, M, K)
X2 = %1.to("RDP")
X3 = Linear(X2)
X4 = Relu(X3)
X5 = Softmax(X4)
X6 = X5.to("CPU")

750

User Program Computation Graph

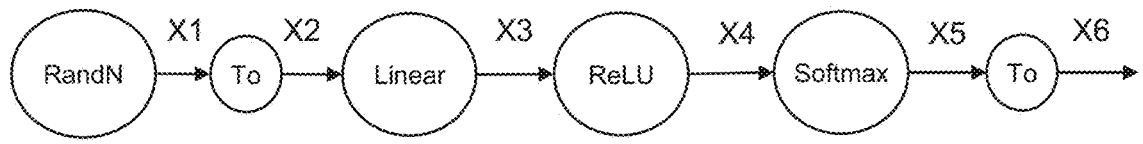

| Air/Tensor Statements | Tensor Size |
|---|---|
| %1 = air.Input(name: "In0"): | NxCxMxK bf16 |
| %2 = air.Linear(%1): | NxCxMxN bf16 |
| %3 = air.ReLU(%2): | NxCxMxN bf16 |
| %4 = air.Exp(%3): | NxCxMxN bf16 ⎤ |
| %5 = air.Sum(%4, dim: 3): | NxCxMx1 bf16 ⎬ Softmax Lowering |
| %6 = air.Div(%4, %5): | NxCxMxN bf16 ⎦ |
| %7 = air.Output(%6) | |

850

Air/Tensor Computation Graph

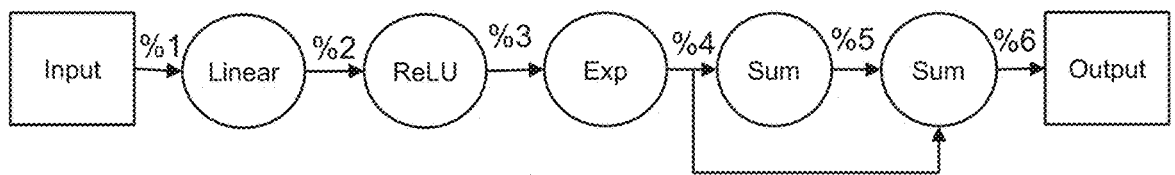

FIG. 8

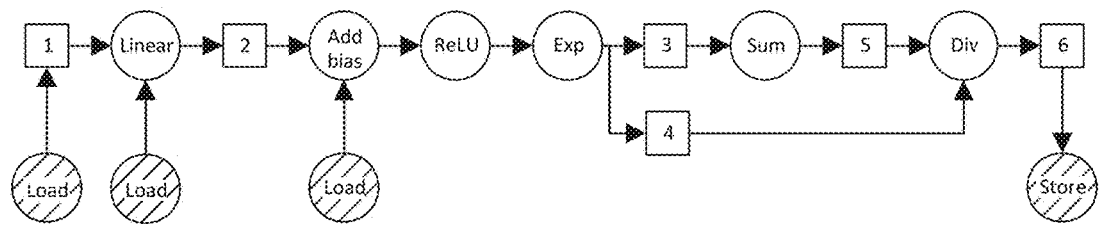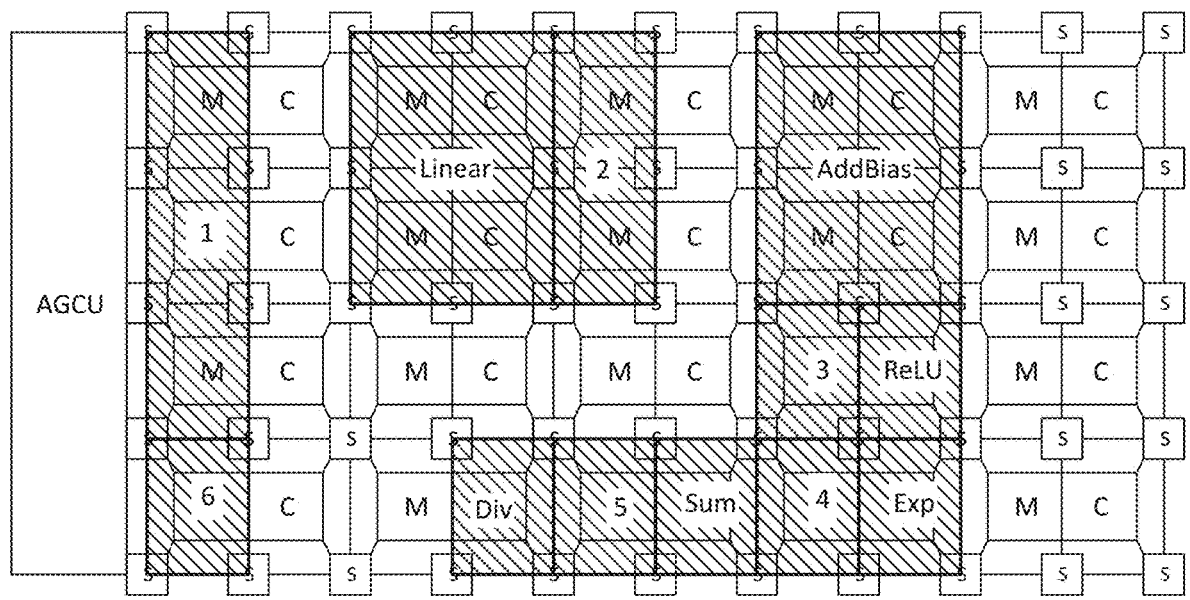
FIG. 11

LOW LATENCY NODES FUSION IN A RECONFIGURABLE DATA PROCESSOR

CROSS-REFERENCE TO RELATED APPLICATIONS

This application claims the benefit of U.S. Provisional Patent Application No. 63/345,762, entitled "Low Latency Nodes Fusion," filed on May 25, 2022, which is hereby incorporated by reference for all purposes.

RELATED APPLICATION(S) AND DOCUMENTS

This application is related to the following papers and commonly owned applications:
Prabhakar et al., "Plasticine: A Reconfigurable Architecture for Parallel Patterns," ISCA '17, Jun. 24-28, 2017, Toronto, ON, Canada;
Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
U.S. Nonprovisional patent application Ser. No. 16/239,252, filed Jan. 3, 2019, now U.S. entitled "VIRTUALIZATION OF A RECONFIGURABLE DATA PROCESSOR;"
U.S. Nonprovisional patent application Ser. No. 16/197,826, filed Nov. 21, 2018, now U.S. entitled "CONFIGURATION LOAD OF A RECONFIGURABLE DATA PROCESSOR;"
U.S. Nonprovisional patent application Ser. No. 16/407,675, filed May 9, 2019, now U.S. Pat. No. 11,386,038, entitled "CONTROL FLOW BARRIER AND RECONFIGURABLE DATA PROCESSOR;"
U.S. Nonprovisional patent application Ser. No. 16/890,841, filed Jun. 2, 2020, entitled "ANTI-CONGESTION FLOW CONTROL FOR RECONFIGURABLE PROCESSORS;"
U.S. Nonprovisional patent application Ser. No. 16/922,975, filed Jul. 7, 2020, entitled "RUNTIME VIRTUALIZATION OF RECONFIGURABLE DATA FLOW RESOURCES;"
U.S. Provisional Patent Application No. 63/236,218, filed Aug. 23, 2021, entitled "SWITCH FOR A RECONFIGURABLE DATAFLOW PROCESSOR."
All of the related application(s) and documents listed above are hereby incorporated by reference herein for all purposes.

TECHNICAL FIELD

The present subject matter relates to head of line mitigation in a data processor, which can be applied to meter access by a plurality of links in a data flow graph to a shared physical interface.

BACKGROUND

The technology disclosed relates to pipeline optimization during compilation of a dataflow graph.

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Systems with reconfigurable processors which execute dataflow graphs include a compiler which translates and synthesizes a machine learning model of the dataflow graphs onto arrays of reconfigurable units. During this process the compiler can go through many phases, one of which is a pipelining phase. In general, a pipeline is a set of data-processing elements connected in series, so that the output of one element is the input to the next element. These elements of a pipeline are executed in parallel, in a time-sliced fashion. Typically, a pipelined system requires more resources, such as circuit elements, processing units and computer memory, than one that executes a batch at a time as each pipeline stage is unable to reuse resources of other stages. This may hamper the overall throughput of the system in general. Therefore, it would be beneficial to reuse resources during the pipelining stage in order to increase the overall performance of such systems.

SUMMARY

Disclosed herein is a method for data processing system, comprising: generating by a compiler, a pipeline of n computational nodes related to a dataflow graph, interleaved between (n+1) buffers on the array of reconfigurable units, performing calculations based on data received from an immediately preceding buffer of the n+1 buffers and storing results of the calculations into an immediately following buffer of the n+1 buffers after a latency, and further removing a buffer of the n+1 buffers from the pipeline based on a comparison of the latencies of the computational nodes.

A data processing system comprising: a compiler configured to generate a pipeline of n computational nodes related to a dataflow graph, interleaved between n+1 buffers on the array of reconfigurable units, wherein each computational node is coupled to perform calculations based on data received from an immediately preceding buffer of the n+1 buffers and store results of the calculations into an immediately following buffer of the n+1 buffers after a latency, and wherein the compiler is further configured to remove a buffer of the n+1 buffers from the pipeline based on a comparison of the latencies of the computational nodes.

Particular aspects of the technology disclosed are described in the claims, specification and drawings.

BRIEF DESCRIPTION OF THE DRAWINGS

The technology will be described with reference to the drawings, in which.

FIG. 7 shows an example implementation of an example user program in a first stage of a compiler stack.

FIG. 8 shows an example implementation of the example user program in a second stage of a compiler stack.

FIG. 11 shows the logical computation graph and an example physical layout of the example user program.

Figure 1:
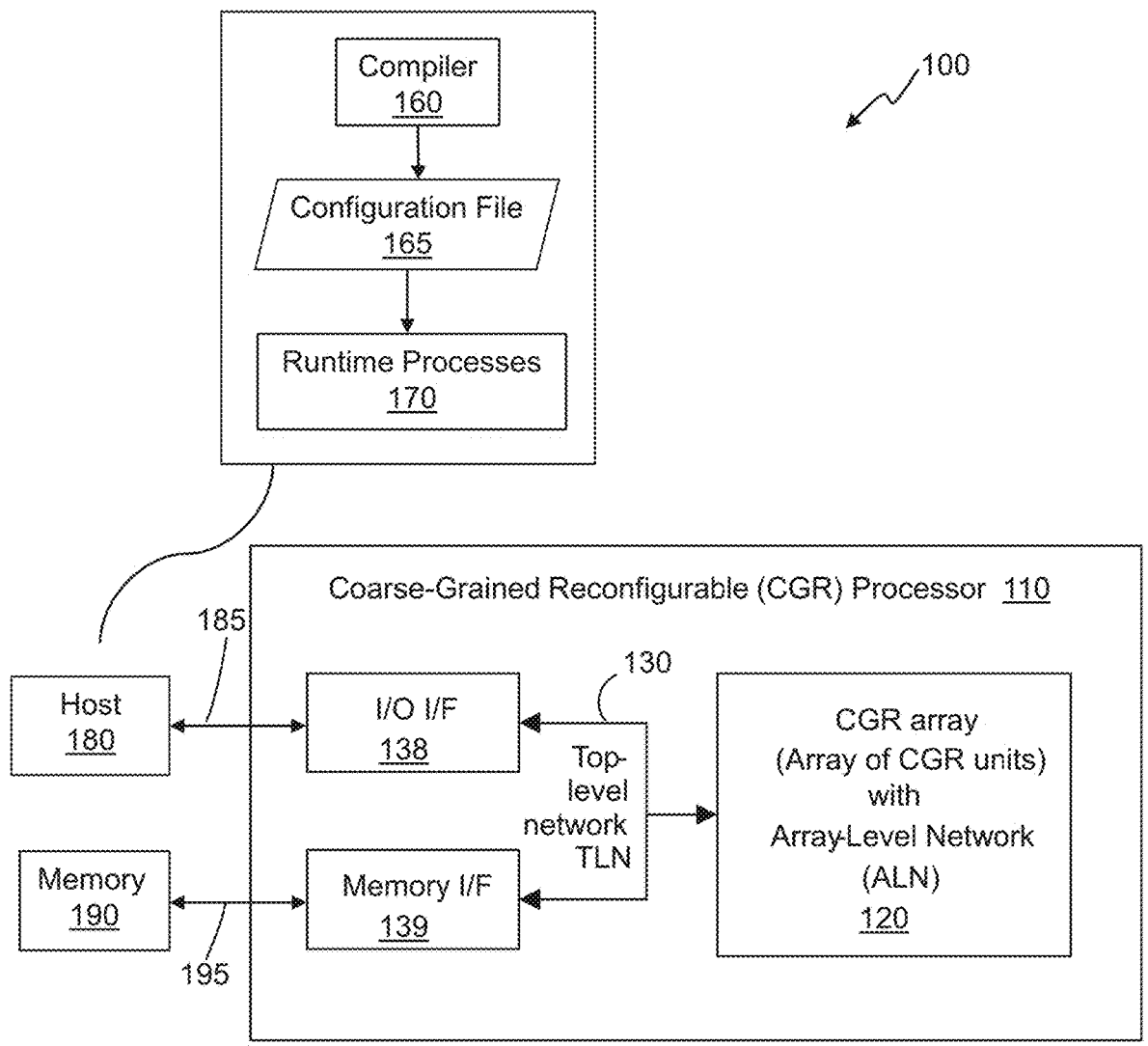
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The technology disclosed relates to pipeline optimization during compilation of a dataflow graph.

In Data Flow Architectures, computation nodes are separated into different pipeline stages delineated by Buffers. Pipeline-Stage fusion is a peephole optimization that attempts to juxtapose low latency nodes together into a single pipeline stage, eliminating their intervening buffer and can be applied transitively. Effectively, this optimization reduces the total number of pipeline stages by 1, at each stage fusion. This optimization is transitively applied subject to latency constraints of the fused pipeline-stage. This optimization reduces chip real-estate, latency as well as improves run-time performance by re allocating saved resources to other computations in the critical path.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hard-wired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to perform one or more operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph and is sometimes referred to as a reconfigurable dataflow unit (RDU).

SIMD—single-instruction multiple-data—an arithmetic logic unit (ALU) that simultaneously performs a single programmable operation on multiple data elements delivering multiple output results.

TLIR—template library intermediate representation.

TLN—top-level network.

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler, see, for example, FIGS. 6-11. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

In dataflow processors with reconfigurable architectures, a pipeline of computational stages can be formed in the array of reconfigurable units to execute dataflow graphs. The computational stages Since various computational stages can have various latencies, efficiently manage the pipeline, especially when it comes to providing the final output of the pipeline can be challenging.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. The array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes 170, as further referenced herein, and may also be used to run computer programs, such as the compiler 160, further described herein with reference to FIG. 6. In some implementations, the compiler may run on a computer that is similar to the computer described with reference to FIG. 2, but separate from host 180.

CGR processor 110 may accomplish computational tasks by executing a configuration file 165 (for example, a PEF file). For the purposes of this description, a configuration file corresponds to a dataflow graph, or a translation of a dataflow graph, and may further include initialization data. A compiler 160 compiles the high-level program to provide the configuration file 165. In some implementations described herein, a CGR array is configured by programming one or more configuration stores with all or parts of the configuration file 165. A single configuration store may be at the level of the CGR processor or the CGR array, or a CGR unit may include an individual configuration store. The configuration file may include configuration data for the CGR array and CGR units in the CGR array, and link the computation graph to the CGR array. Execution of the configuration file 165 by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
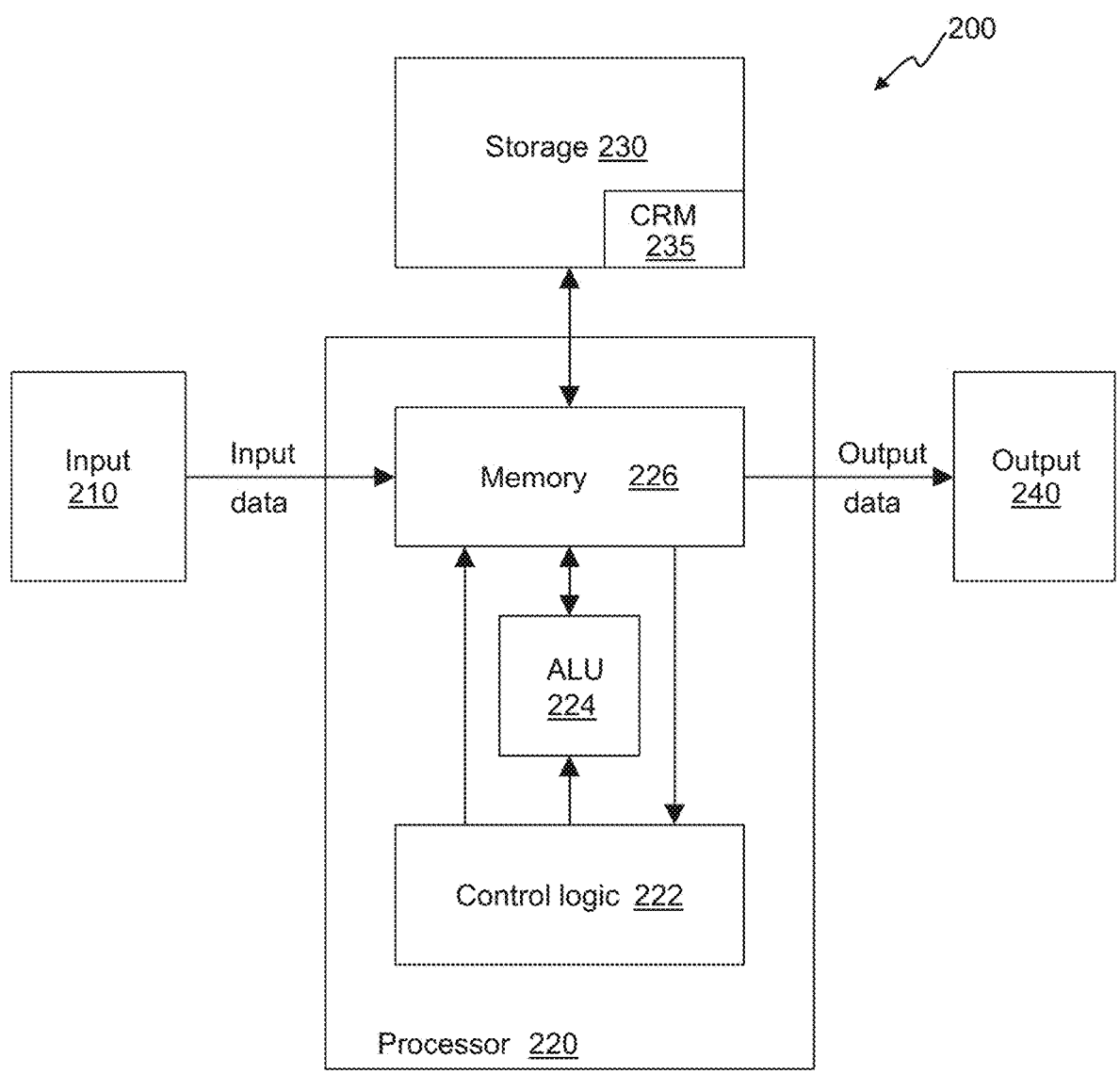
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
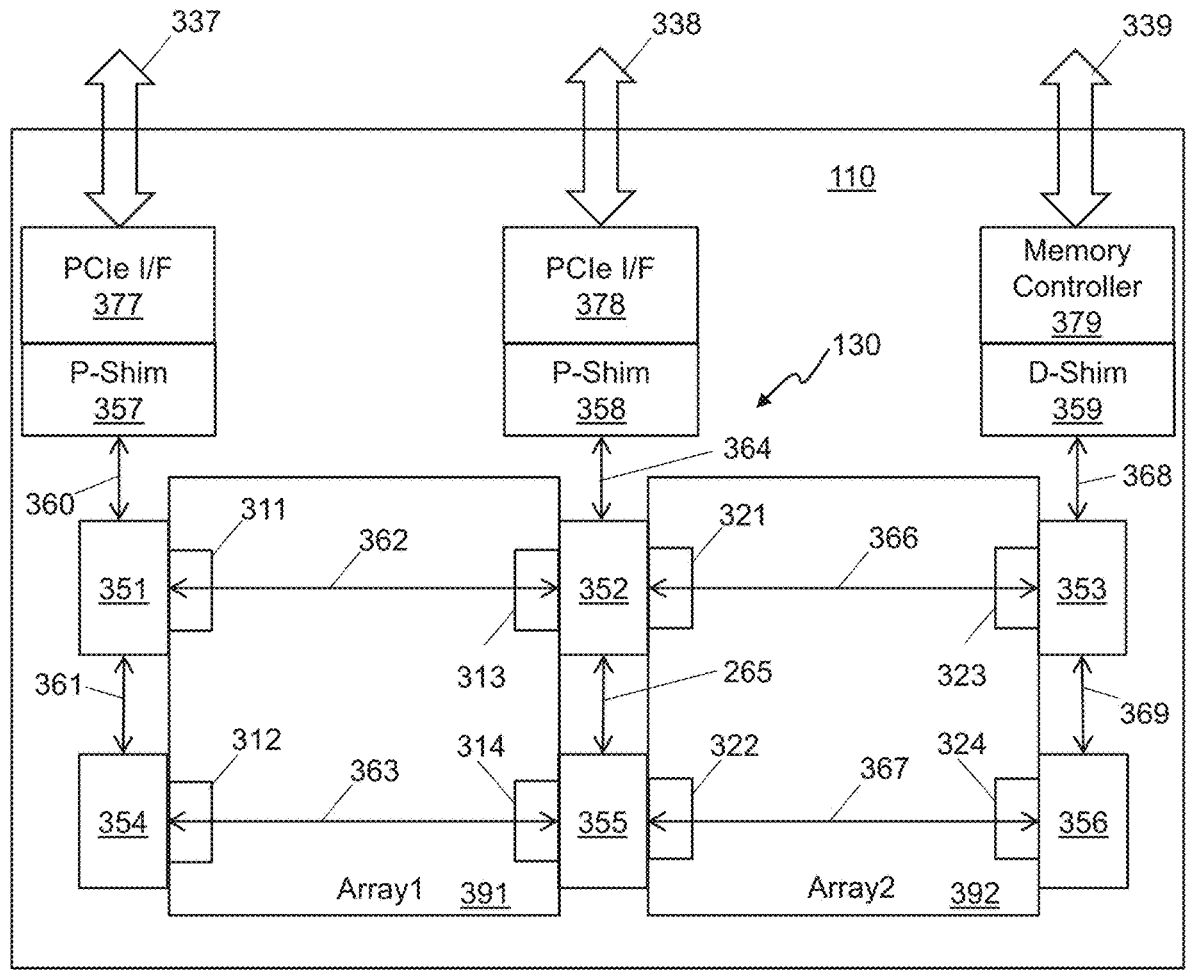
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
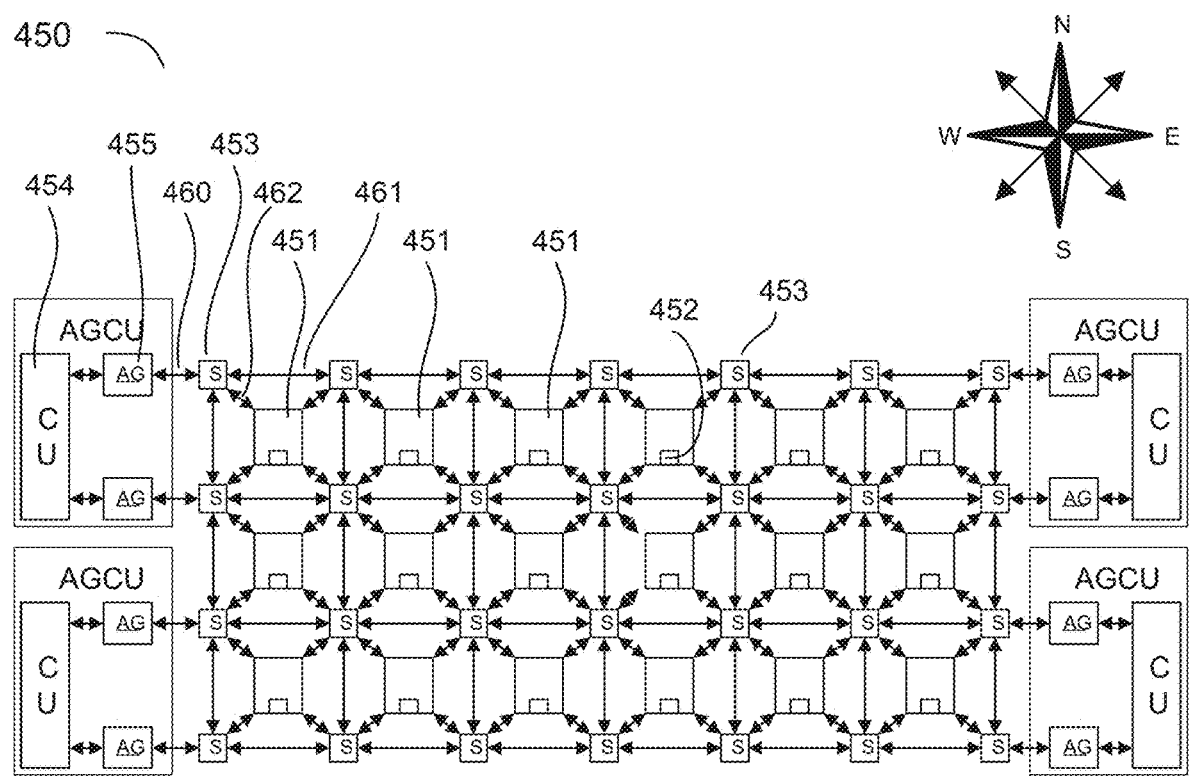
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with the two address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
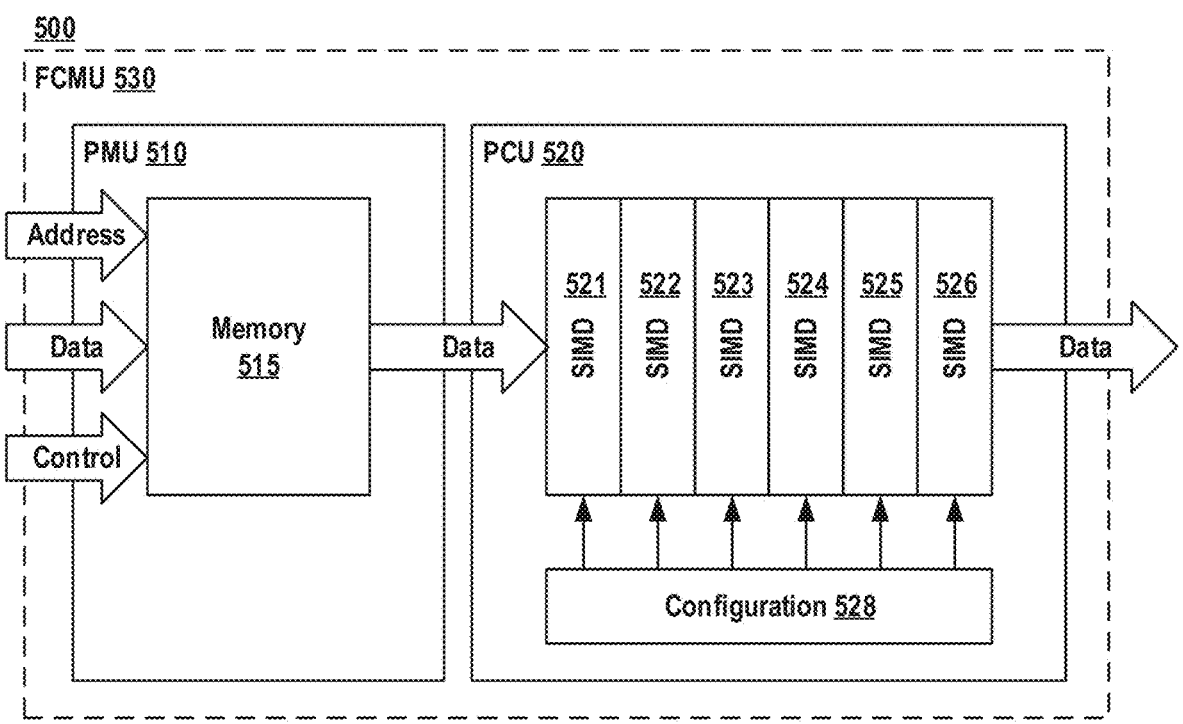
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters.

Short-term storage, for example during one to several clock cycles or unit delays, allows for synchronization of data in the PCU pipeline.

Figure 6:
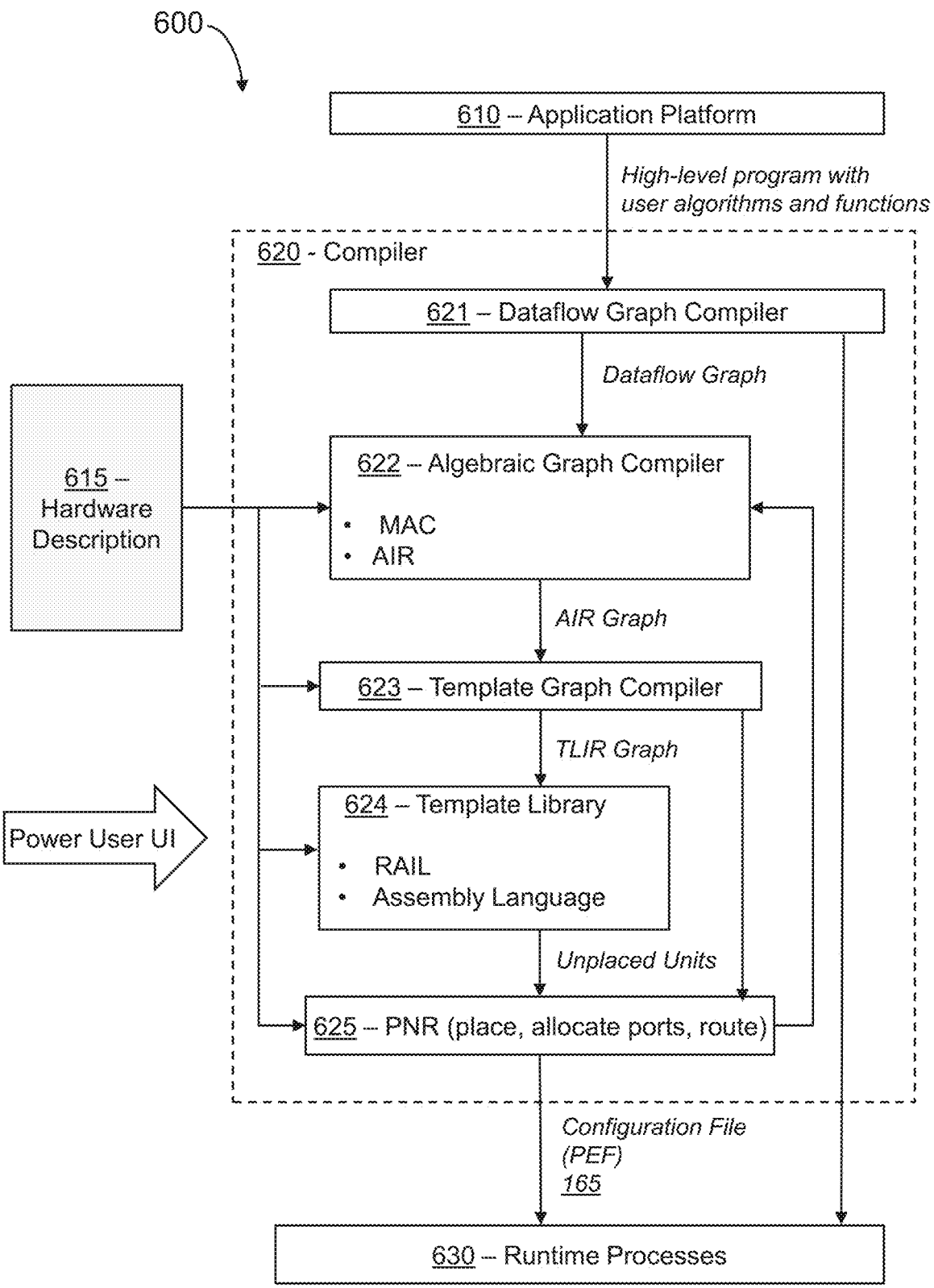
FIG. 6 is a block diagram of a compiler stack implementation suitable for generating a configuration file for a CGR processor.
Figure 9:
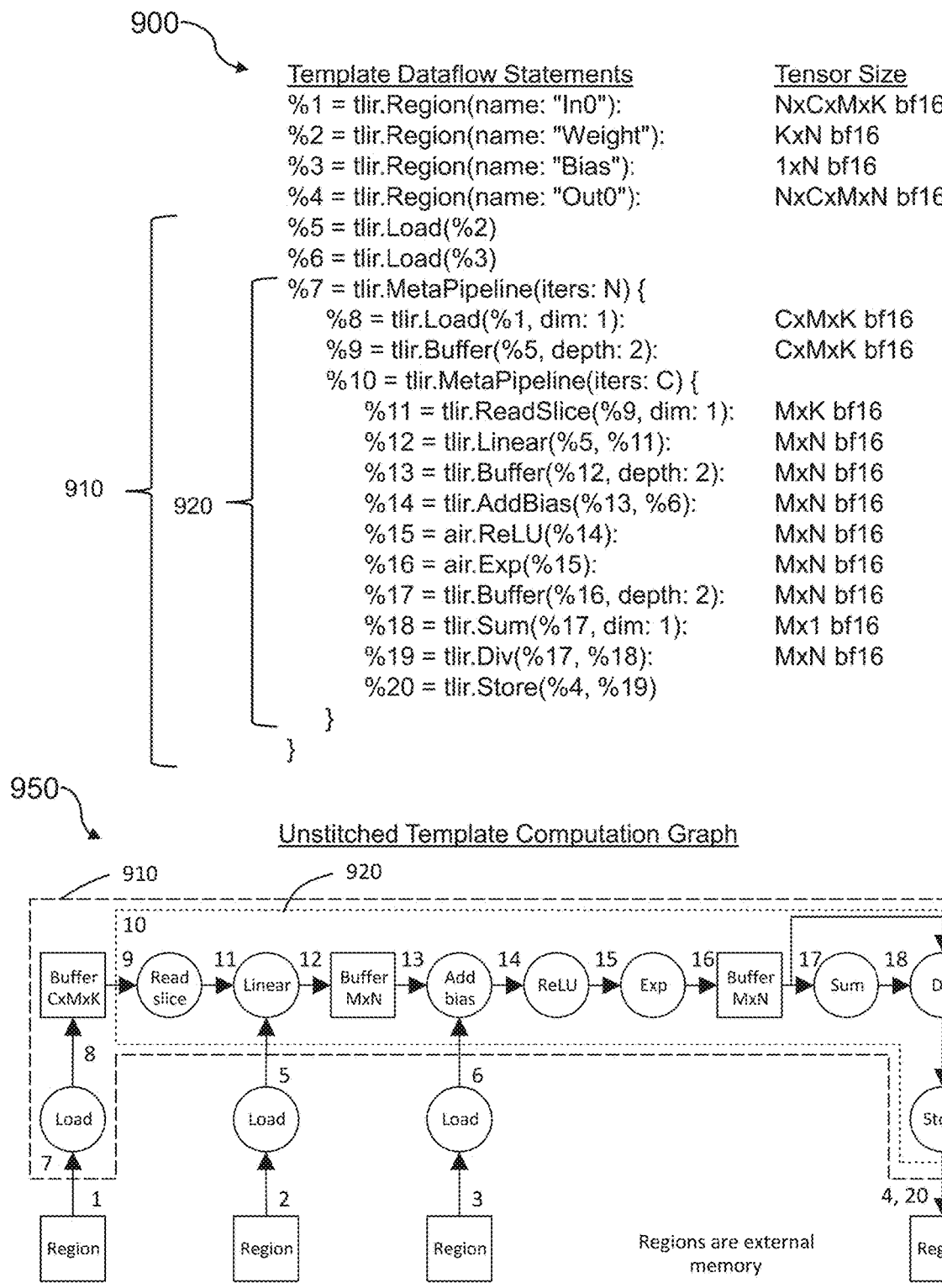
FIG. 9 shows an example implementation of the example user program in a third stage of a compiler stack.

FIG. 6 is a block diagram of a compiler stack 600 implementation suitable for generating a configuration file for a CGR processor. FIGS. 7-11 illustrate various representations of an example user program 700 corresponding to various stages of a compiler stack such as compiler stack 600. As depicted, compiler stack 600 includes several stages to convert a high-level program (e.g., user program 700) with user program statements 710 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 700 depicted in FIG. 7 comprises user program statements 710 that invoke various PyTorch functions.

FIG. 7 shows an example implementation of an example user program 700 in a first stage of a compiler stack. The example user program 700 generates a random tensor X1 with a normal distribution in the RandN node. It provides then tensor to a neural network cell that performs a weighing function (in the Linear node) followed by a rectified linear unit (ReLU) activation function, which is followed by a Softmax activation function, for example to normalize the output to a probability distribution over a predicted output class. FIG. 7 does not show the weights and bias used for the weighing function.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router PNR 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program. Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) layer that makes high-level mapping decisions for (sub-graphs of the) dataflow graph based on hardware constraints. It may support various application frontends such as Samba, JAX, and TensorFlow/HLO. Algebraic graph compiler 622 may also transform the graphs by automatically generating gradient computing graphs, perform stitching between sub-graphs, for performance and latency estimation, convert dataflow graph operations to AIR operation, perform tiling, sharding (database partitioning) and other operations, and model the parallelism that can be achieved on the dataflow graphs.

Algebraic graph compiler 622 may further include an arithmetic or algebraic intermediate representation (AIR) level that translates high-level graph and mapping decisions provided by the MAC layer into explicit AIR graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput. The AIR layer constructs pipelines based on MAC mapping decisions by placing operations into a metapipe and inserting stage buffers between them. It may also insert AllReduce instructions for collecting results from parallelized operations. It may also further optimize by redundant operation and dead code elimination, pipeline collapsing, and operation fusion.

FIG. 8 shows an example implementation of user program 700 in the second stage of the compiler stack. At this stage, the algebraic graph compiler replaces the Softmax macro by its constituents. The Softmax function is given as $$\frac{e^{\{z_i\}}}{\sum_{j=1}^{K} e^{\{z_j\}}}.$$

This function includes an exponential component, a summation, and a division. Thus, algebraic graph compiler 622 replaces the user program statements 710, also shown as computation graph 750, by AIR/Tensor statements 800, also shown as Air/Tensor computation graph 850.

Template graph compiler 623 may translate AIR statements and/or graphs into TLIR, also referred to as template dataflow statements 900 (see FIG. 9) and/or graphs (unstitched template computation graph 950 is shown), optimizing for the target hardware architecture into unplaced variable-sized units (referred to as logical CGR units) suitable for PNR 625. Template graph compiler 623 may allocate meta-pipelines, such as meta-pipeline 910 and meta-pipeline 920, for sections of the template dataflow statements 900 and corresponding sections of unstitched template computation graph 950. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Template library 924 provides templates for commonly used operations, for example GEMM. Templates are implemented using assembly language. Templates are further compiled by an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 10:
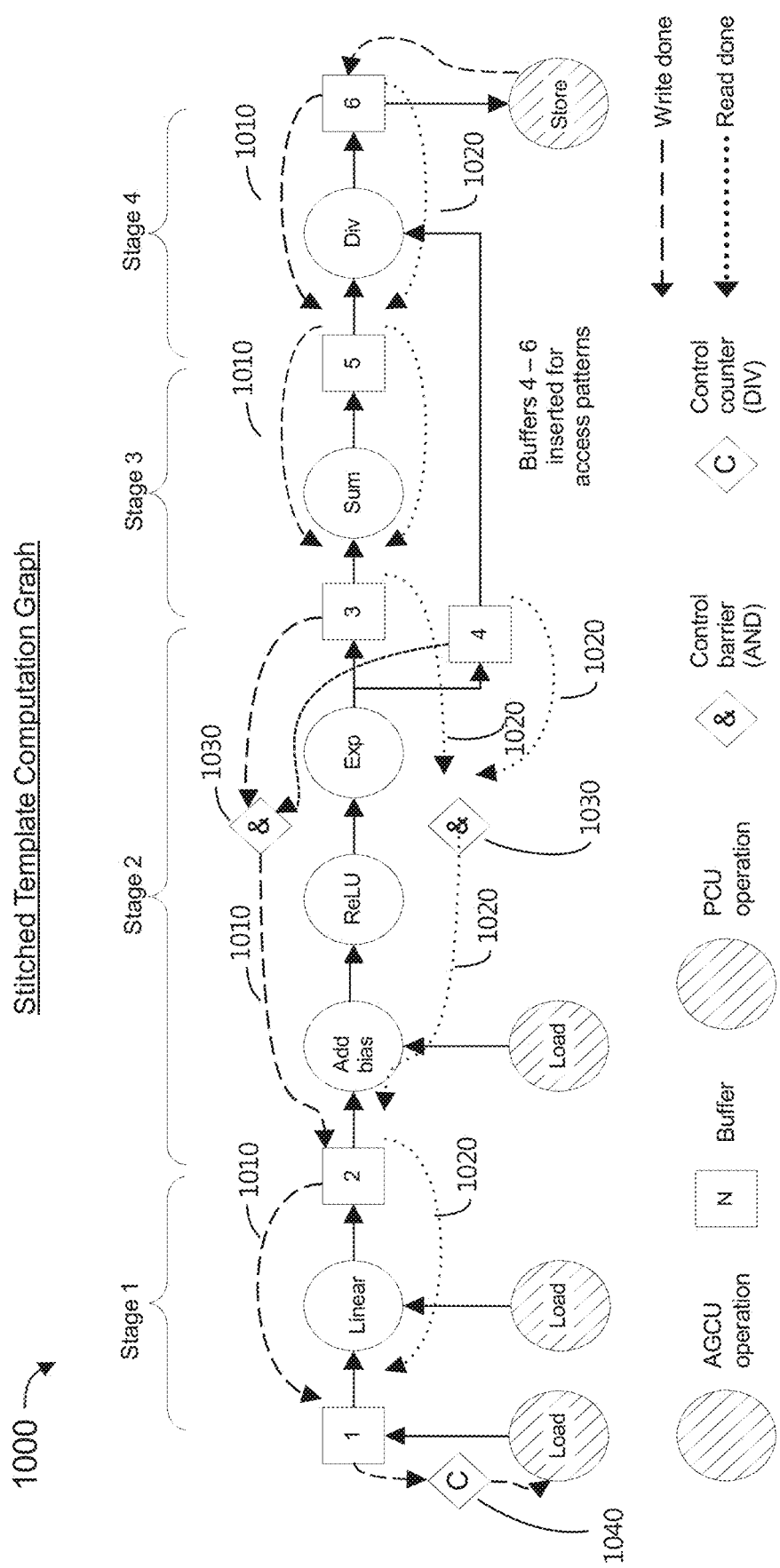
FIG. 10 shows an example implementation of the example user program in a fourth stage of a compiler stack.

FIG. 10 shows an example implementation of the example user program 700 in a fourth stage of the compiler stack. The template graph compiler 623 may also determine the control signals 1010 and 1020, as well as control gates 1030 and 1040 required to enable the CGR units (whether logical or physical) to coordinate dataflow between the CGR units in the CGR array of a CGR processor. This process, sometimes referred to as stitching, produces a stitched template compute graph 1000 with control signals 1010 and 1020 and control gates 1030 and 1040. In the example depicted in FIG. 10, the control signals include write done signals 1010 and read done signals 1020, and the control gates include 'AND' gates 1030 and a counting or 'DIV' gate 1040. The control signals and control gates enable coordinated dataflow between the configurable units of CGR processors such as compute units, memory units, and AGCUs.

PNR 625 translates and maps logical (i.e., unplaced physically realizable) CGR units (e.g., the nodes of the logical computation graph 1100 shown in FIG. 11) to a physical layout (e.g., the physical layout 1150 shown in FIG. 11) on the physical level, e.g., a physical array of CGR units in a semiconductor chip. PNR 625 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside an RDU. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into multiple subgraphs such as memory subgraphs or compute subgraphs and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

After software-stack compilation of dataflow graphs, all compute nodes in the graph are assigned a dedicated pipeline stage with a stage buffer before and after that graph-node. A stage-buffer implementation can range from one to several PMUs and consumes variable on-chip SRAM resources. The compiler 620 may then estimate a latency for each stage in the pipeline and further determine the longest latency for each pipeline. As different nodes require varied compute complexity, some stages consume smaller latency compared to other nodes. In general, a data graph sample that has completed computation at the current stage will wait in a stage buffer before the next stage until the latter computation is complete for another sample. This will be explained in greater detail with regard to FIG. 12.

Figure 12:
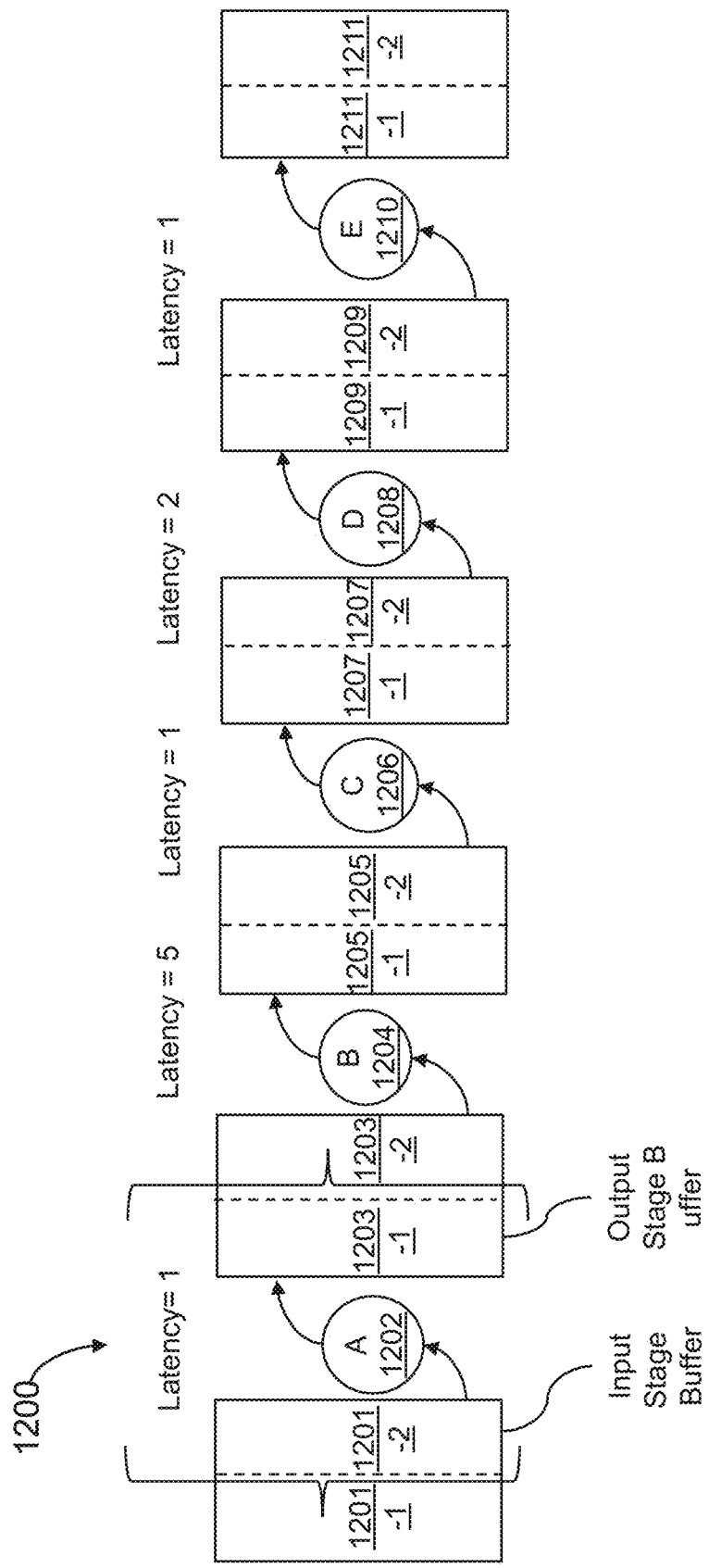
FIG. 12 is an example of a dataflow pipeline with different stage latencies.

FIG. 12 is an example of a dataflow pipeline 1200 generated by the compiler 620 shown in FIG. 6, according to an embodiment of the present disclosure. As explained earlier, the compiler 620 may generate a pipeline of several computational nodes combined with buffers during various stages including during dataflow graph compiler 621 stage, algebraic graph compiler 622 stage, the template graph compiler 623 stage, and the template library 624 stage, before generating the unplaced units to be provided to the PNR 625 block. The computational nodes may perform the mathematical calculations and provide the results to a storage buffer. As can be appreciated each node can have a different latency (delay in calculating results of an assigned mathematical operation.

Illustrated in FIG. 12 are a few nodes including A 1202, B 1204, C 1206, D 1208, and E 1210 with latencies 1, 5, 1, 2, 1 respectively. There can be as many nodes as necessary for the compilation of the dataflow graph. FIG. 12 also illustrates stage buffers 1201, 1203, 1205, 1207, 1209, and 1211 placed in between the nodes.

Each buffer also includes an input portion and an output portion. For example, the stage buffer 1201 can have an input portion 1201-1 and an output portion 1201-2, the stage buffer 1203 can have an input portion 1203-1 and an output portion 1203-2, the buffer 1205 can have an input portion 1205-1 and an output portion 1205-2, the buffer 1207 can have an input portion 1207-1 and an output portion 1207-2, the stage buffer 1209 can have an input portion 1209-1 and an output portion 1209-2, and the stage buffer 1211 can have an input portion 1211-1 and an output portion 1211-2. More specifically, the input portion 1211-1 and the output portion 1211-2 can be arranged as a queue or a pipeline so that the data coming into the input portion 1211-1 is moved to the output portion 1211-2. In some implementations, each input portion and output portion can have arranged in a pipeline and the data coming into the input portion (from a preceding node) can pass through the input portion's sub-buffers and further through the output portion's sub-buffers to a succeeding node. The number of multiple sub-buffers in the input portion and the output portion of a buffer may be equal or different. Additionally, the number of sub-buffers in all the buffers may be equal or different as well depending on the design considerations.

These nodes may represent a particular stage in the dataflow graph. Each node is coupled to a buffer before and a buffer after it. Generally speaking, in one embodiment, any node is coupled to perform calculations based on results of the calculations stored in the output portion of the buffer before it; and store results of its calculations in the input portion of the buffer after it. For example, the node A 1202 may perform calculations based on results/data stored in the output portion 1201-2, which is the output portion of the buffer 1201. The node A 1202 may further provide the results of its calculations in the input portion 1203-1, which is the input portion of the stage buffer 1203. Additionally, in general a stage may include a node, the buffer before the node, and the buffer after the node. For example, the node A 1202, the buffer 1201, and the stage buffer 1203 may form one stage. In other embodiments, a stage may include a node, an output portion of the buffer before the node, and an input portion of the buffer after the node. For example, the node B 1204, the output portion 1203-2 of the stage buffer 1203, and the input portion 1205-1 the buffer 1205 may form one stage.

Each of these nodes may execute a portion of the dataflow graph and provide its results to its assigned stage buffer after the specified latency. Each node may further hold the results in its assigned stage buffer until all of the results from other nodes are available. Since the node with the longest latency will provide its result the last, the other nodes with smaller latencies have to hold the results in their respective storage buffers until the longest latency result is available. In this example, the node B has the highest latency of 5, whereas other nodes have latencies lower than 5. Since the results are just being held, those storage buffers stay occupied for a long time taking up unnecessary space. According to an embodiment of the present disclosure, the nodes with lower latencies than the highest latency can be fused together in such a way that their respective stage buffers are eliminated without compromising the overall pipeline latency. This embodiment will be explained in greater detail with regard to FIG. 13.

Figure 13:
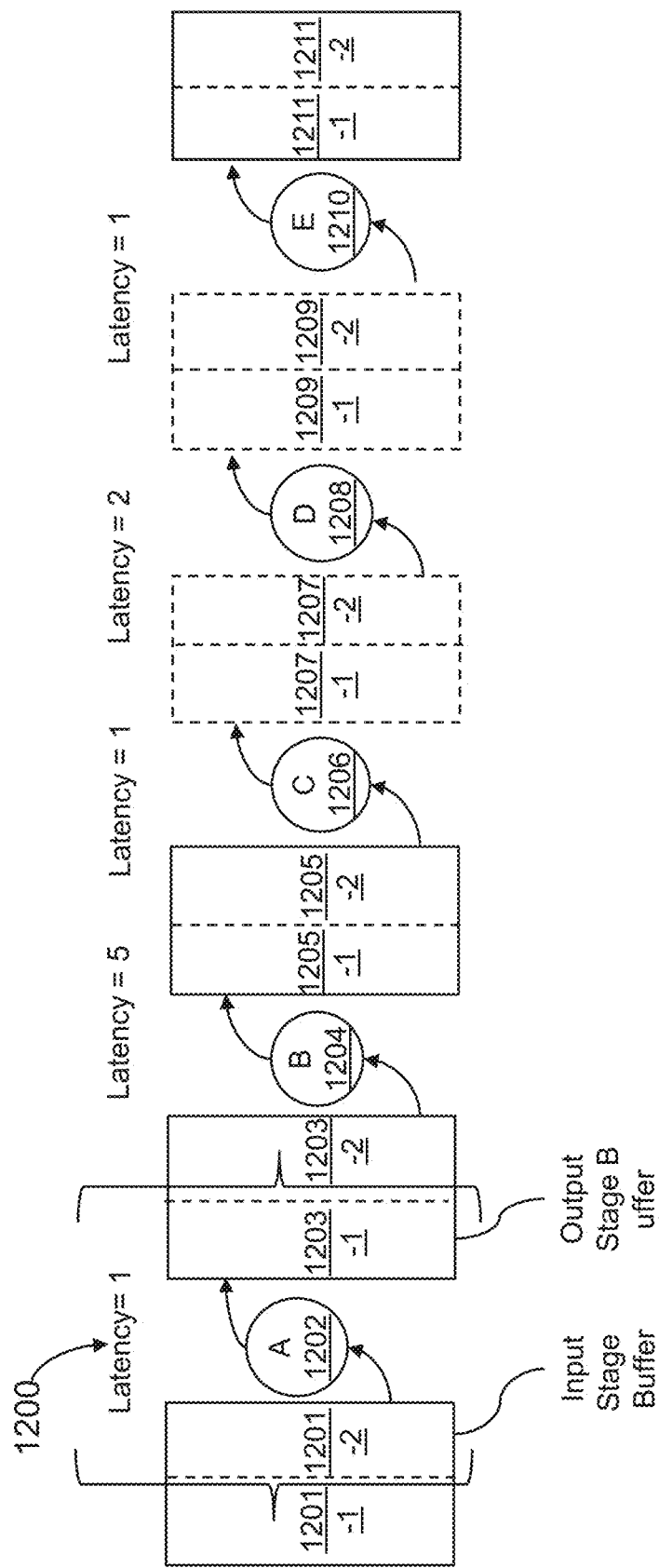
FIG. 13 is an example of a dataflow pipeline with different stage latencies with eliminated stage buffers, according to an embodiment of the present disclosure.

FIG. 13 is an example of the dataflow pipeline 1200 with some fused nodes and eliminated stage buffers, according to an embodiment of the present disclosure. As shown the node C 1206 (with previous latency 1) and the node E 1210 (with previous latency 1) are fused (as shown by dotted lines) with the node D 1208 which originally had a latency of 2, however upon fusion with the nodes C and E to form a fused node CDE 1212, with a latency of 4, which is still lower than the longest latency of 5 associated with the node B 1204. Additionally, stage buffers 1207 and 1209 can be eliminated and the results of the fused node F can be stored in the stage buffer 1211. Advantageously, this can minimize the number of storage buffers. As explained previously, the storage buffers are in the form of programmable memory units (PMUs), fusion of nodes can result in an efficient use of PMUs.

FIG. 13 is an example of a dataflow pipeline with different stage latencies with eliminated stage buffers, according to an embodiment of the present disclosure. As shown, the nodes by the dotted lines, the stage buffer 1207 after the node C 1206 and the stage buffer 1209 after the node D 1208 are eliminated while keeping the nodes intact. In one example, as shown by the arrows, the node C 1206 can provide its results directly to the node D 1208; furthermore, the node D 1208 can provide its results directly to the node E 1210, the results of which can be stored in the stage buffer 1211. Advantageously, this can minimize the number of storage buffers. As explained previously, the storage buffers are in the form of programmable memory units (PMUs), fusion of nodes can result in an efficient use of PMUs.

Figure 14:
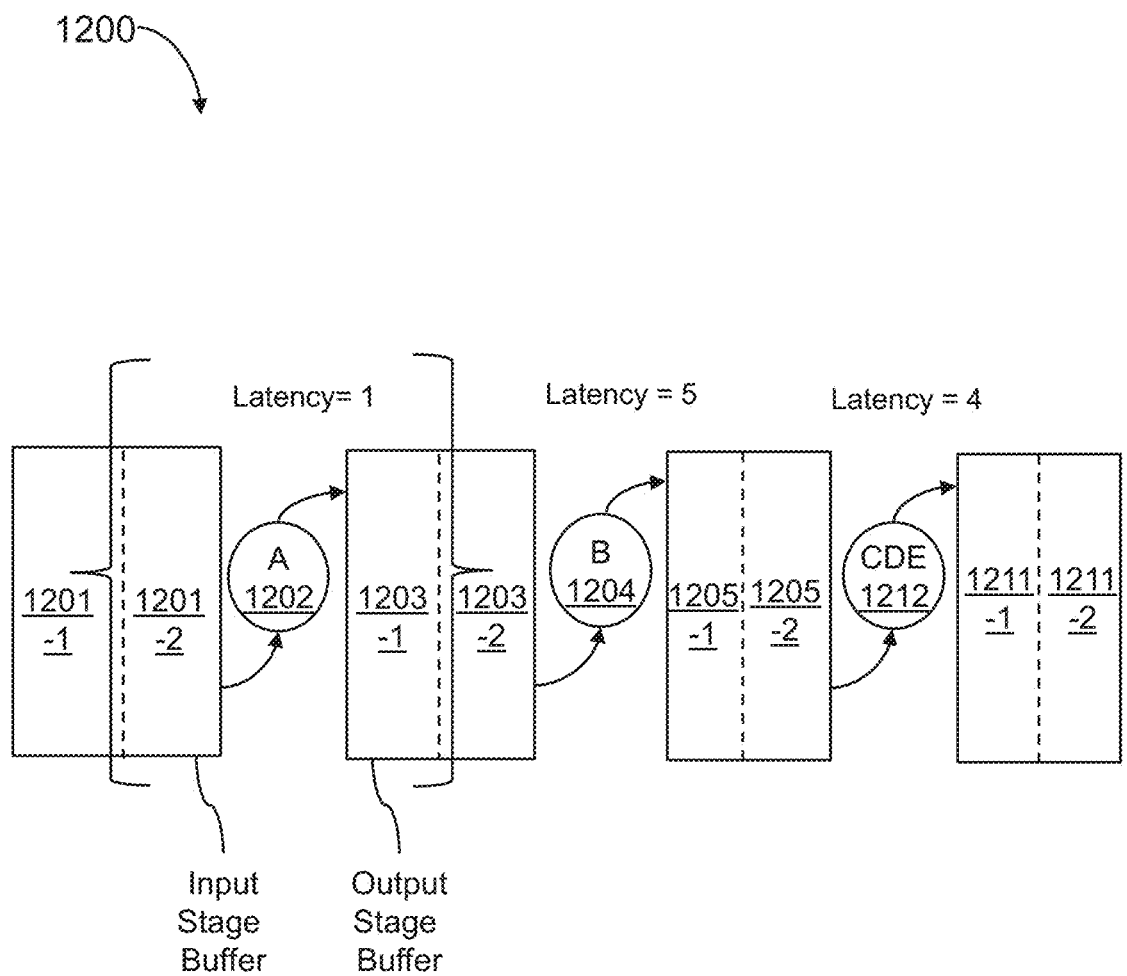
FIG. 14 is an example of a dataflow pipeline with different stage latencies with fused nodes, according to an embodiment of the present disclosure.

FIG. 14 is an example of the dataflow pipeline 1200 with some fused nodes and eliminated stage buffers, according to an embodiment of the present disclosure. As shown the nodes C 1206 (with previous latency 1) and D 1208 (with previous latency 2) are fused (as shown by dotted lines) with the node E 1210 which originally had a latency of 1, however upon fusion with the nodes C and D to form a fused node CDE 1212, with a latency of 4 (combined latencies of C, D, and E) which is still lower than the longest latency of 5 associated with the node B 1204. Advantageously, this can minimize the number of storage buffers and nodes. As explained previously, in one example, the nodes are formed in the PCUs and buffers are formed in the PMUs. Therefore, the fusion of nodes results in the elimination of one or more intermediate buffers, freeing up the PMUs in which the buffers are initially formed. In other words, the nodes end up using a smaller number of PMUs than before leading to a more efficient use of the PMUs. Additionally, the freed-up PMUs can be available to be used by other PCUs, which results in a more efficient use of the PCUs. As such advantageously, the nodes fusion results in an efficient use of PMUs as well as PCUs.

Figure 15:
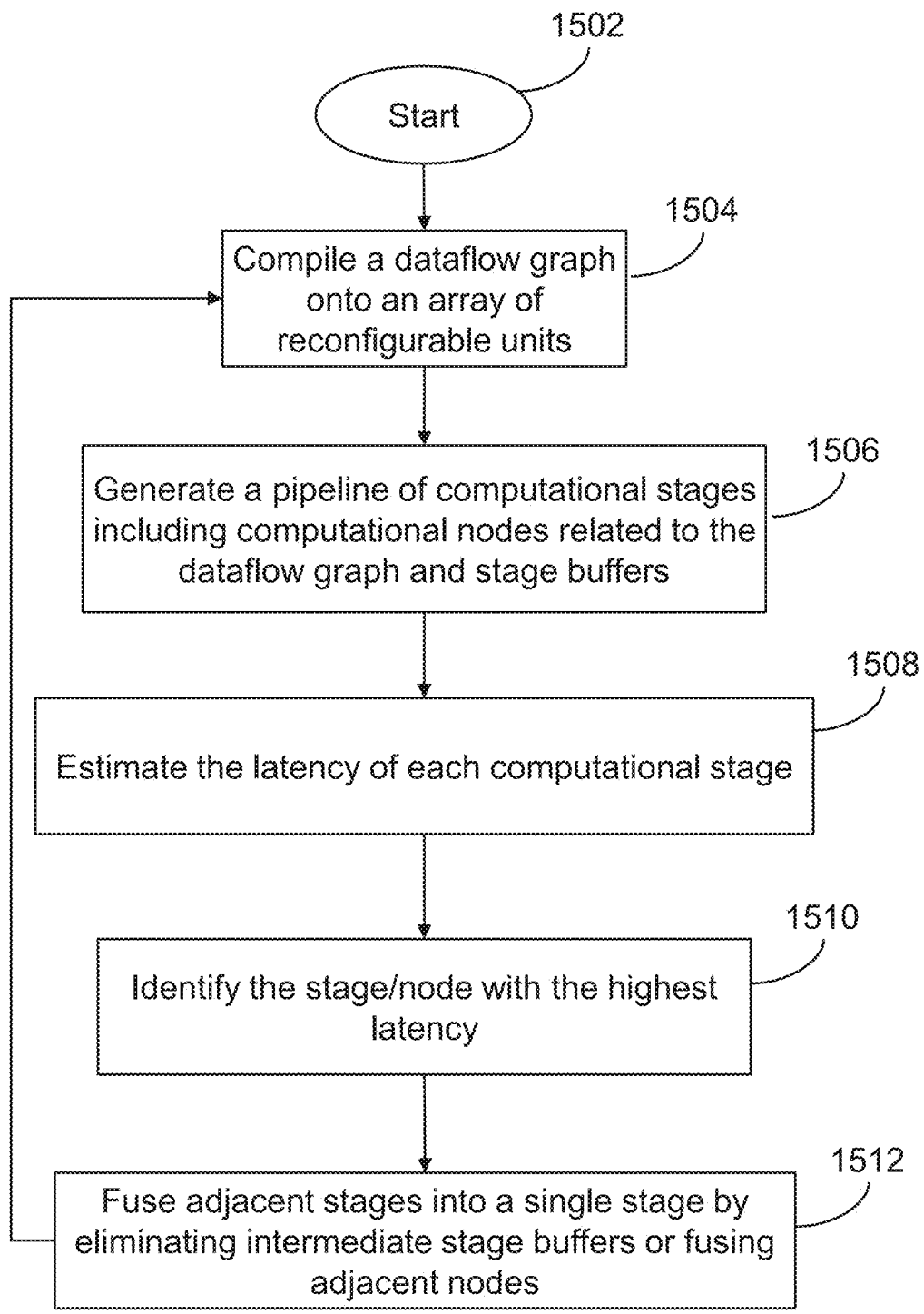
FIG. 15 is an example flow diagram for the RDU shown in FIG. 4 to manage a dataflow pipeline, according to an embodiment of the present disclosure.

FIG. 15 is an example flow diagram of a method for the RDU shown in FIG. 4 to manage a dataflow pipeline, according to an embodiment of the present disclosure.

As shown, after starting at operation 1502, a data flow graph may be compiled onto an array of reconfigurable units at operation 1504. For example, as shown in FIG. 6, the dataflow graph compiler 621 can compile a dataflow graph and provide that to the runtime processes 630 which are executed on the CGRA processor. The method may then proceed to operation 1506.

At operation 1506, a pipeline of computational stages including computational nodes related to the dataflow graph and stage buffers, may be generated. For example, FIG. 12 shows an example dataflow pipeline 1200 generated by the compiler. The pipeline includes computational nodes and stage buffers. The method may then proceed to operation 1508.

At operation 1508, the latency of each computational stage can be estimated. The method may then proceed to operation 1510.

At operation 1510, the node/stage with the highest latency may be identified. The method may then proceed to operation 1512. For example, FIG. 12 shows the node B 1204 having the highest latency of five. The node B 1204, the stage buffer 1203 before that and the buffer 1205 after that can be considered as a stage. The method may then proceed to operation 1512.

At operation 1512, adjacent stages can be fused into a single stage by eliminating intermediate stage buffers or fusing adjacent nodes. For example, as shown in FIG. 13, the intermediate stage buffers 1207 and 1209 are eliminated. Furthermore, as shown in FIG. 14, the nodes C 1206 and D 1208 are fused with the node E 1210 to form a fused node CDE 1212.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

In one embodiment, each of the AGCUs may be allocated a specific bandwidth to access TLN. This is similar to VAGs participating and winning arbitration to get access to the TLN. For example, the CGR processor 110 may include one or more AGCU arbiters to arbitrate among the AGCUs 202 to 232 to gain access to the TLN agents 244 to 266. The arbiter may be implemented in hardware or software or both.

In one example, a software implemented arbiter may keep a table of AGCUs and their need to access the external memory devices or host. Those AGCUs which have a higher need to access the external memory devices or host, may be assigned a higher priority than those which have a lower need. The higher priority AGCUs may be selected to access TLN. In other words, the higher priority AGCUs may get more bandwidth on the TLN than the lower priority ones.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations in the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

What is claimed is:

1. A data processing system comprising:
   a compiler configured to generate a pipeline of n computational nodes related to a dataflow graph, interleaved between n+1 buffers,
   wherein each computational node is coupled to perform calculations based on data received from an immediately preceding buffer of the n+1 buffers and store results of the calculations into an immediately following buffer of the n+1 buffers after a latency,
   and wherein the compiler is further configured to remove a buffer of the n+1 buffers from the pipeline based on a comparison of the latencies of the computational nodes.

2. The system of claim 1, wherein the compiler is further configured to fuse a computational node immediately preceding the removed buffer with a computational node immediately following the removed buffer to produce a pipeline having n–1 computational nodes and n buffers.

3. The system of claim 1, wherein the compiler is configured to estimate the latency of each computational node.

4. The system of claim 3, wherein the compiler is configured to identify a computational node with a highest latency and further identify one or more adjacent computational nodes having a combined latency lower than or equal to the highest latency.

5. The system of claim 4, wherein the compiler is further configured to remove buffers between the one or more adjacent computational nodes a having a combined latency lower than or equal to the highest latency, to produce a sequence of coupled computational nodes.

6. The system of claim 5, wherein the compiler is further configured to fuse the sequence of coupled computational nodes into a fused computational node.

7. The system of claim 1, wherein each buffer of the n+1 buffers is divisible into an input portion that receives data and an output portion that provides data concurrent with the input portion receiving data.

8. The system of claim 7, wherein each computational node of the n+1 computational nodes is coupled to perform calculations based on data from the output portion of the immediately preceding buffer and store results of the calculations into the input portion of the immediately following buffer of the n+1 buffers of the pipeline.

9. The system of claim 1, further comprising:
   an array of reconfigurable units and a configuration module to provide configuration data to configure a plurality of configurable elements in the array of reconfigurable units such as memory units, compute units, and communication elements.

10. The system of claim 9, wherein each of the n computational nodes is formed in a compute unit and each of the n+1 buffers are formed in a memory unit.

11. A method for data processing system, comprising:
    generating by a compiler, a pipeline of n computational nodes related to a dataflow graph, interleaved between (n+1) buffers,
    performing calculations based on data received from an immediately preceding buffer of the n+1 buffers and storing results of the calculations into an immediately following buffer of the n+1 buffers after a latency,
    and further removing a buffer of the n+1 buffers from the pipeline based on a comparison of the latencies of the computational nodes.

12. The method of claim 11 further comprising fusing by the compiler, a computational node immediately preceding the removed buffer with a computational node immediately following the removed buffer to produce a pipeline having n–1 computational nodes and n buffers.

13. The method of claim 11 further comprising estimating by the compiler, the latency of each computational node of the n computational nodes.

14. The method of claim 13 further comprising identifying by the compiler, a computational node with a highest latency and further identifying one or more adjacent computational nodes having a combined latency lower than or equal to the highest latency.

15. The method of claim 14 further comprising removing by the compiler, buffers between one or more adjacent computational nodes having a combined latency lower than or equal to the highest latency, to produce a sequence of coupled computational nodes.

16. The method of claim 15 further comprising fusing by the compiler, the sequence of coupled computational nodes into a fused computational node.

17. The method of claim 11 wherein each buffer of the n+1 buffers is divisible into an input portion that receives data and an output portion that provides data concurrent with the input portion receiving data.

18. The method of claim 17 performing by each computational node of the n+1 computational nodes, calculations based on data from the output portion of the immediately preceding buffer and storing results of the calculations into the input portion of the immediately following buffer of the n+1 buffers of the pipeline.

19. The method of claim 11 further comprising providing configuration data to an array of reconfigurable units by a configuration module, to configure a plurality of configurable elements in the array of reconfigurable units such as a plurality of memory units, a plurality of compute units, and a plurality of communication elements.

20. The method of claim 19 further comprising forming each of the n computational nodes in a compute unit and forming each of the n+1 buffers in a memory unit.

* * * * *